US011959415B2

(12) United States Patent
Tamegai

(10) Patent No.: US 11,959,415 B2
(45) Date of Patent: Apr. 16, 2024

(54) INTERNAL COMBUSTION ENGINE FITTED WITH ENGINE COVER

(71) Applicant: HONDA MOTOR CO., LTD., Tokyo (JP)

(72) Inventor: Masahiko Tamegai, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/059,684

(22) Filed: Nov. 29, 2022

(65) Prior Publication Data

US 2023/0220798 A1 Jul. 13, 2023

(30) Foreign Application Priority Data

Jan. 7, 2022 (JP) ................................ 2022-001414

(51) Int. Cl.
*F02B 77/13* (2006.01)
*F02M 39/02* (2006.01)

(52) U.S. Cl.
CPC ............. *F02B 77/13* (2013.01); *F02M 39/02* (2013.01)

(58) Field of Classification Search
CPC ...... F02B 77/13; F02M 39/02; F02M 59/485; F02M 59/44; F02F 7/0021; F02F 7/008
See application file for complete search history.

(56) References Cited

U.S. PATENT DOCUMENTS

| | | | |
|---|---|---|---|
| 9,816,460 B2 | 11/2017 | Kondo | |
| 9,955,562 B2 | 4/2018 | Tanahashi et al. | |
| 2006/0073310 A1 | 4/2006 | Winkler | |

FOREIGN PATENT DOCUMENTS

| | | | | |
|---|---|---|---|---|
| JP | 2001098954 A | * | 4/2001 | .............. F02B 77/13 |
| JP | 2001098954 A | | 4/2001 | |
| JP | 2006522890 A | | 10/2006 | |
| JP | 2013113107 A | * | 6/2013 | ................ F01L 1/34 |
| JP | 2013113107 A | | 6/2013 | |
| JP | 2015083788 A | | 4/2015 | |
| JP | 2016125398 A | | 7/2016 | |
| JP | 2018071457 A | * | 5/2018 | |
| JP | 2018071457 A | | 5/2018 | |
| WO | 2014042157 A1 | | 3/2014 | |

OTHER PUBLICATIONS

Notice of Reasons for Refusal for Japanese Patent Application No. 2022-001414 dated Aug. 8, 2023; 8 pp.

* cited by examiner

*Primary Examiner* — Jacob M Amick
*Assistant Examiner* — Charles J Brauch
(74) *Attorney, Agent, or Firm* — Armstrong Teasdale LLP

(57) ABSTRACT

In an internal combustion engine (1) comprising an electroconductive cylinder head (3), a head cover (5) attached to the cylinder head, a fuel pump (11) attached to the cylinder head and including an electroconductive pump case electrically connected to the cylinder head, and an engine cover (30) positioned so as to oppose the head cover and the fuel pump, the engine cover includes a sound insulating material (31) in contact with the pump case.

7 Claims, 5 Drawing Sheets

INTERNAL COMBUSTION ENGINE FITTED WITH ENGINE COVER

TECHNICAL FIELD

The present invention relates to an internal combustion engine fitted with an engine cover.

BACKGROUND ART

WO2014/042157A1 (U.S. Pat. No. 9,816,460B2) discloses an engine cover including a cover main body made of polyurethane foam, a skin layer consisting of polyurethane paint applied to the surface of the cover main body, and a plurality of mounting members provided on the cover main body to engage the corresponding mounting pins provided on the head cover. The mounting members are made of a thermoplastic polyurethane elastomer. Such an engine cover is advantageous in terms of reduced weight and cost owing to the simplicity in the structure thereof.

However, the engine covers made of resin materials such as polyurethane foam are known to suffer from the problem of being easily electrostatically charged. In particular, when the mounting members as well as the head cover are made of electrically insulating material, there is no path for the electrostatic charge created in the engine cover to escape so that the engine cover is highly likely to be electrostatically charged. Since a wire harness for supplying electric power to the ignition plugs is typically positioned between the engine cover and the head cover, the electrostatic charge of the engine cover may adversely affect fuel injectors and spark plugs.

SUMMARY OF THE INVENTION

In view of such a problem of the prior art, a primary object of the present invention is to provide an internal combustion engine fitted with an engine cover which is relatively free from accumulation of an electrostatic charge.

To achieve such an object, one aspect of the present invention provides an internal combustion engine (1), comprising: an electroconductive cylinder head (3); a head cover (5) attached to the cylinder head; a fuel pump (11) attached to the cylinder head and including an electroconductive pump case electrically connected to the cylinder head; and an engine cover (30) positioned so as to oppose the head cover and the fuel pump, wherein the engine cover includes a sound insulating material (31) in contact with the pump case. Thereby, an electrostatic charge generated in the engine cover is conducted to the cylinder head via the pump case so that the engine cover is prevented from becoming electrostatically charged.

Preferably, the fuel pump is attached to a longitudinal end part of the cylinder head, and the head cover is overlaid on the cylinder head, the engine cover being overlaid on the head cover and the fuel pump. The engine cover is thereby enabled to effectively shield sound emission from the fuel pump as well as from the engine itself.

Preferably, the engine further includes a spark plug (21) having an upper end projecting from an upper surface of the cylinder head, and a wire harness (22) positioned between the head cover and the engine cover for supplying electric power to the spark plug.

The engine cover can conceal the spark plug and the wire harness from view. Although the wire harness and the spark plug may be positioned adjacent to the engine cover, since the engine cover is electrically connected to the cylinder head via the pump case, the engine cover is prevented from being electrostatically charged.

Preferably, the sound insulating material is made of polyurethane foam.

Thereby, the sound insulating material can be manufactured both easily and economically, and a favorable sound insulating performance can be achieved.

Preferably, the head cover is provided with a plurality of locking projections (35), and the engine cover is provided with grommets (38) configured to detachably engage the corresponding locking projections.

Thereby, attaching the engine cover to the head cover can be facilitated.

Preferably, the grommets are made of elastomeric material.

Thereby, the engine cover can be detachably secured to the head cover both easily and reliably.

Preferably, the head cover is made of polyamide synthetic resin.

Polyamide synthetic resin has favorable mechanical properties, and is durable in harsh environments, but is known to have a tendency to generate an electrostatic charge when rubbed against polyurethane or other common plastic materials. However, since the engine cover is prevented from being electrostatically charged, the material for the head cover and the engine cover can be freely selected without any concern for the issues of an electrostatic charge.

Preferably, the fuel pump includes a pump drive shaft (14) connected to a camshaft (8) of the engine, a cam (15) fixedly provided on the pump drive shaft, a plunger (16) extending orthogonally to the pump drive shaft and configured to reciprocate driven by the cam, wherein the pump case includes a first case part (18) directly attached to the cylinder head and a second case part (19) attached to the first case part and supporting the plunger so as to reciprocate therein, the second case part extending from the first case part toward the engine cover, and in contact with the sound insulating material. Further, the second case part may have a cylindrical outer shape while the sound insulating material is in contact with an outer peripheral surface of the second case part.

Since the second case part extends from the first case part toward the engine cover, the sound insulating material can easily come into contact with the pump case so as to provide a path for the electrostatic charge to escape from the engine cover to the pump case, and then to the cylinder head.

Preferably, the sound insulating material is provided with a receiving recess (56) configured to complementarily receive a part of the second case part.

Thereby, a favorable contact between the sound insulating material and the second case part can be easily maintained.

Preferably, the receiving recess is provided with an end wall (57) axially opposing an end face (58) of the second case part.

Thereby, the movement of the sound insulating material with respect to the second case part can be favorably restricted.

The present invention thus provides an internal combustion engine fitted with an engine cover which is relatively free from accumulation of an electrostatic charge.

DESCRIPTION OF THE PREFERRED EMBODIMENT(S)

Figure 1:
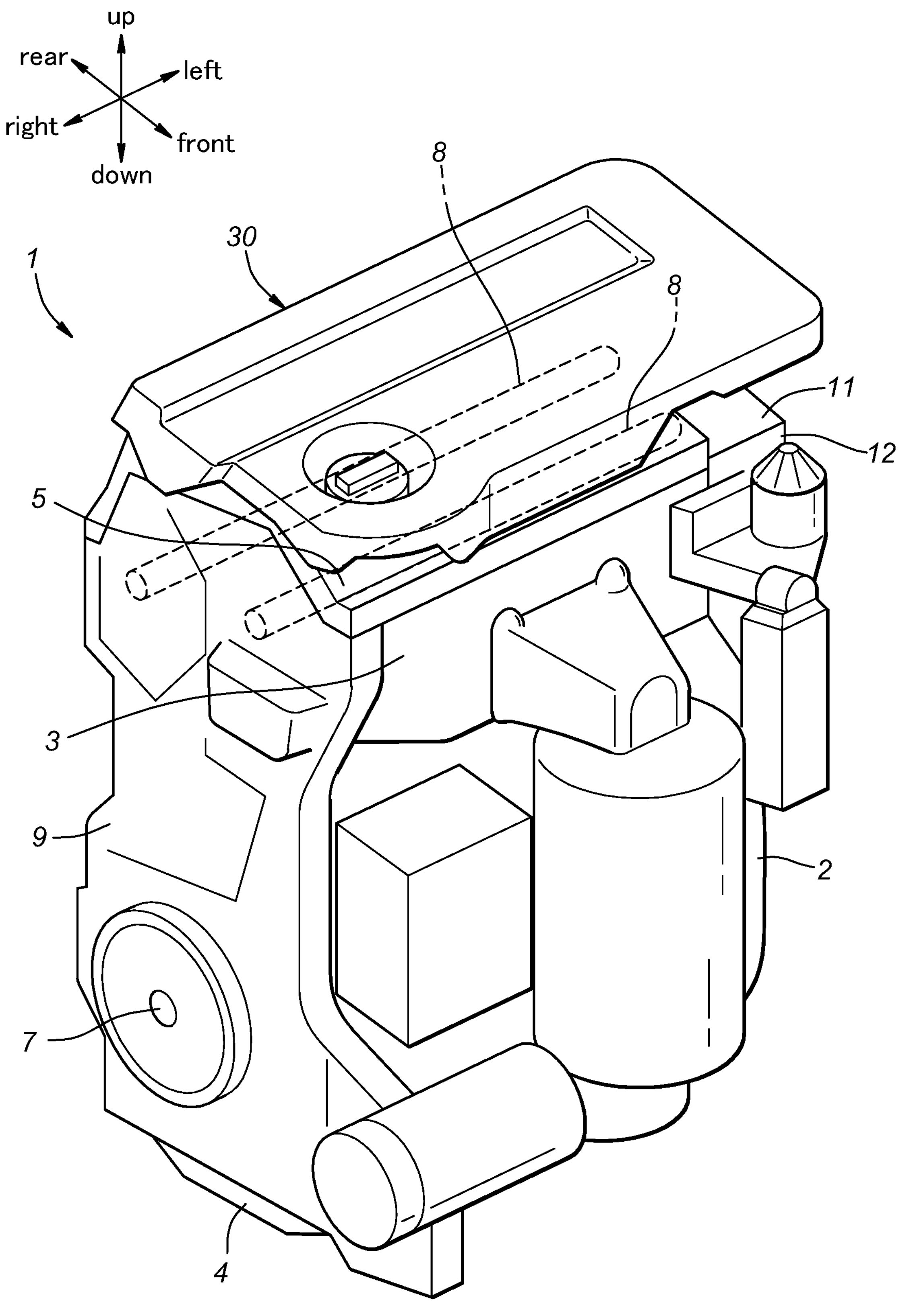
FIG. 1 is a perspective view of an internal combustion engine according to an embodiment of the present invention.

FIG. 1 shows an overall view of an internal combustion engine according to an embodiment of the present invention. The internal combustion engine 1 includes a cylinder block 2, a cylinder head 3 attached to the upper end of the cylinder block 2, an oil pan 4 attached to the lower end of the cylinder block 2, and a head cover 5 attached to the upper end of the cylinder head 3. The head cover 5 is substantially conformal to the upper end of the cylinder head 3.

The cylinder block 2 has four cylinders (not shown in the drawings) arranged in a single row, and a lower part of the cylinder block 2 forms a crankcase which defines a crankcase chamber jointly with the oil pan 4. Each cylinder slidably receives a piston (not shown in the drawings), and the crankcase rotatably supports a crankshaft 7 which extends along the cylinder row. The pistons are connected to the crankshaft via respective connecting rods in a per se known manner. In this embodiment, the cylinder row (the crankshaft) extends laterally of the vehicle on which this engine is mounted.

The lower end of the cylinder head 3 defines combustion chambers communicating with the respective cylinders on the bottom side thereof, and is provided with intake ports and exhaust ports that communicate with the corresponding combustion chambers. In this embodiment, the intake ports extend rearward from the combustion chambers to the rear surface of the cylinder head 3, and the exhaust ports extend forward from the combustion chambers to the front surface of the cylinder head 3. Between the cylinder head 3 and the head cover 5 is defined a valve chamber which accommodates therein a valve mechanism for driving the intake valves provided in the intake ports and the exhaust valves provided in the exhaust ports. The valve mechanism includes a camshaft 8 (or a pair of camshafts 8) extending in parallel to the crankshaft 7. One end of the camshaft 8 is connected to the corresponding end of the crankshaft 7 by a timing chain. A chain cover 9 is attached to the ends of the cylinder block 2 and the cylinder head 3 to jointly define a space accommodating the timing chain therein. The chain cover 9 thus covers the one end of the crankshaft 7, the one end of the camshaft 8, and the timing chain.

The cylinder head 3 is made of an electroconductive material such as metal or alloy. The cylinder head 3 is made of an aluminum alloy in this embodiment. The head cover 5 is preferably made of a resin material. The head cover 5 is preferably made of a non-electroconductive material such as polyamide synthetic resin (Nylon) or any other resin material. The cylinder head 3 is preferably connected to the vehicle body frame or the negative terminal of the vehicle battery by a grounding wire.

Figure 2:
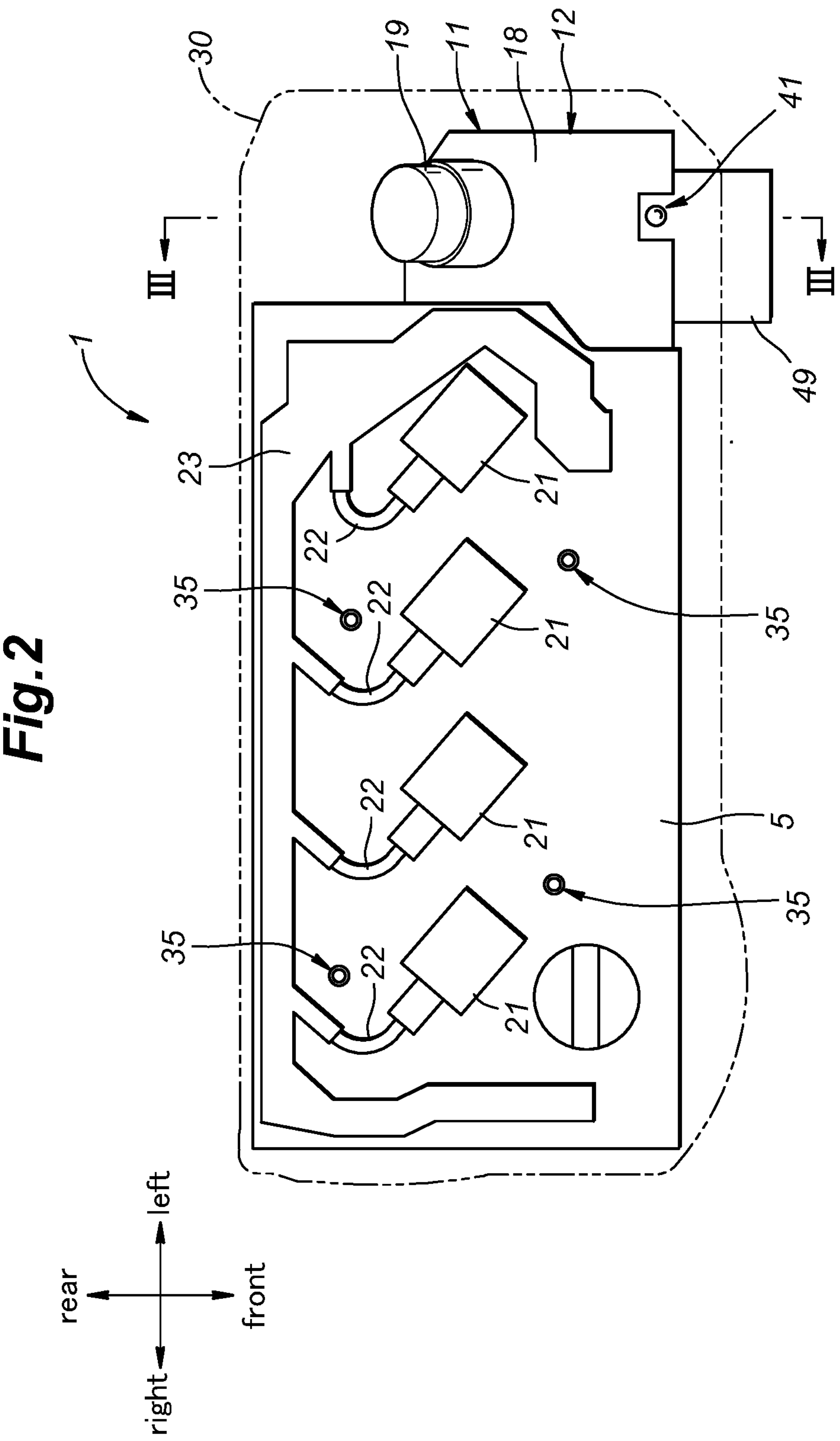
FIG. 2 is a top view of the head cover and the fuel pump of the internal combustion engine.

As shown in FIGS. 1 and 2, a fuel pump 11 for the internal combustion engine is attached to the left end (or the longitudinal end) of the cylinder head 3. The fuel pump 11 supplies the fuel under pressure from the fuel tank to the injectors. Each injector injects fuel into the corresponding combustion chamber or intake port. The fuel may be a known liquid fuel such as gasoline or diesel oil.

The fuel pump 11 is provided with a pump case 12 which is electroconductive and directly attached to the longitudinal end part of the cylinder head 3. The pump case 12 is preferably made of an electroconductive metal such as stainless steel or cast iron. The pump case 12 is preferably fastened to the cylinder head 3 with fastening members such as bolts. The pump case 12 is in contact with and electrically connected to the cylinder head 3. In an alternate embodiment, part of the pump case 12 is formed integrally with the cylinder head 3. The fuel pump 11 may consist of a per se known plunger pump (piston pump).

Figure 3:
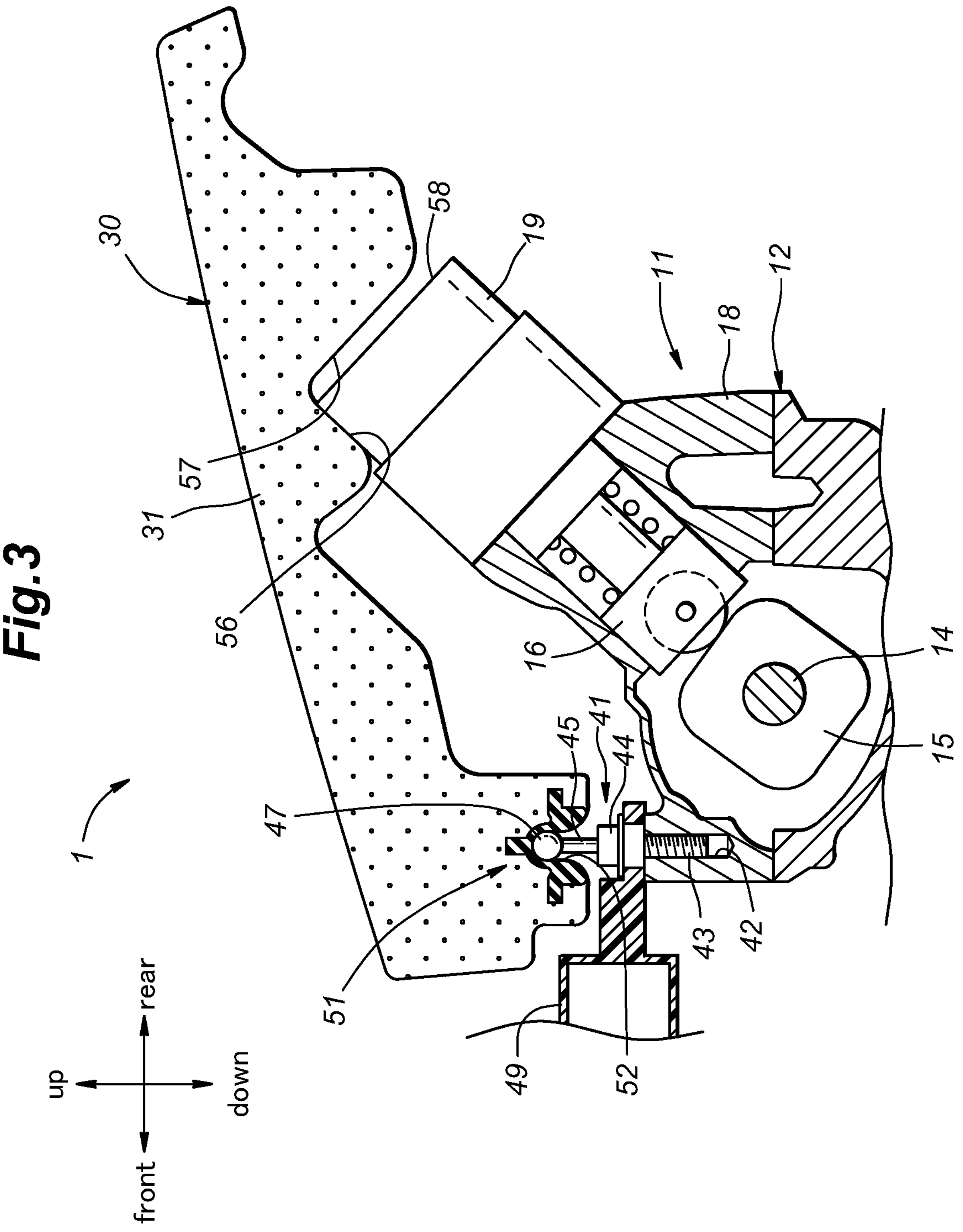
FIG. 3 is a sectional view of the engine cover and the fuel pump taken along line III-III in FIG. 2.

As shown in FIG. 3, in this embodiment, the fuel pump 11 includes a pump drive shaft 14 coaxially connected to the camshaft 8 so as to rotate jointly with the camshaft 8, a cam 15 fixedly secured to the drive shaft 14, and a plunger 16 extending orthogonally to the pump drive shaft 14 and disposed so as to reciprocate along the axial direction thereof by being actuated by the cam 15. The pump case 12 includes a first case part 18 that rotatably supports the pump drive shaft 14 and is directly attached to the cylinder head 3, and a second case part 19 that is attached to the first case part 18 and supports the plunger 16 so as to reciprocate. The pump drive shaft 14 may be formed integrally with the camshaft 8. The fuel in the fuel tank is pressurized and forwarded to the injectors owing to the reciprocating motion of the plunger 16.

The second case part 19 has a cylindrical outer shape, and extends upward from the first case part 18 in the axial direction thereof. In this embodiment, the second case part 19 extends obliquely upward and rearward with respect to the engine. The upper end of the second case part 19 preferably protrudes upward from the upper end of the cylinder head 3. The first case part 18 and the second case part 19 are made of electroconductive metal. The first case part 18 is electrically connected to the cylinder head 3, and the second case part 19 is electrically connected to the first case part 18.

The upper ends of spark plugs 21 project upward from the top side of the head cover 5. Each spark plug 21 extends vertically and has a lower end located in the corresponding combustion chamber. The upper end of the spark plug 21 is connected to a wire harness 22 which supplies electric power to the spark plugs 21. The wire harness 22 consists of a bundle of electric wires, and the bundled main part extends along the rear edge of the cylinder head 3, and individual electric wires extend from the bundled main part to the corresponding spark plugs in a substantially forward direction. The wire harness 22 is covered by a harness cover 23 except for the free ends of the individual electric wires. The harness cover 23 is directly placed on and attached to the upper surface of the head cover 5. The harness cover 23 may include a main part extending along the rear edge of the cylinder head 3, and a pair of end parts that extend forward from either lateral end of the main part of the harness cover 23.

The engine cover 30 is positioned directly above the head cover 5, as shown in FIG. 1. The engine cover 30 is formed in a substantially rectangular plate shape elongated in the lateral direction, and has a major plane facing vertically. The engine cover 30 opposes the head cover 5 and the fuel pump 11. The left end of the engine cover 30 protrudes leftward from the left end of the cylinder head 3 and is positioned directly above the fuel pump 11. The front-to-rear width of the engine cover 30 is approximately the same as the front-to-rear width of the head cover 5. The engine cover 30 is preferably formed in a substantially rectangular shape when viewed from above. A left end part of the engine cover 30 covers the fuel pump 11 from above, and the remaining part of the engine cover 30 substantially conformally covers the head cover 5 from above.

As shown in FIG. 3, the engine cover 30 is substantially entirely made of a sound insulating material 31 such as polyurethane foam which is electrically insulating. The sound insulating material 31 may be, for example, a polyether-based polyurethane foam material. A skin material may be provided on the outer surface of the sound insulating material 31. The skin material is preferably formed as a film or sheet of a resin material such as polyurethane resin.

As shown in FIG. 2, the spark plugs 21, the wire harness 22, and the wire harness cover 23 are positioned between the head cover 5 and the engine cover 30. In other words, the engine cover 30 covers the spark plugs 21, the wire harness 22, and the harness cover 23 from above.

Figure 4:
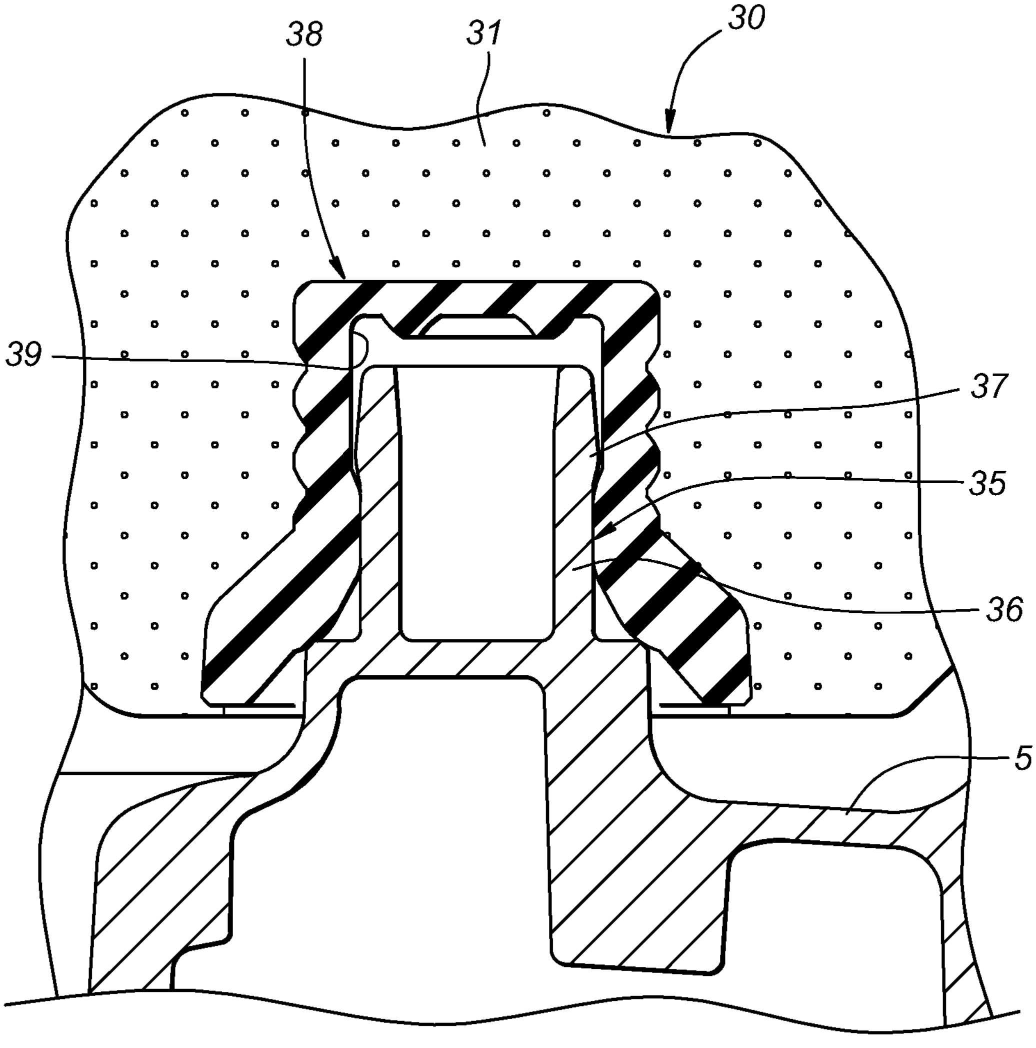
FIG. 4 is a fragmentary sectional view of an engagement structure between the engine cover and the head cover.

The head cover 5 is provided with a plurality of first locking projections 35, four in the illustrated embodiment. As shown in FIG. 4, the first locking projections 35 each include a tubular portion 36 projecting upward and integrally formed with the head cover 5 and an annular bead 37 provided circumferentially on the outer peripheral surface of the tubular portion 36 and projecting radially outward. The corresponding parts of the engine cover 30 are each provided with a first grommet 38 embedded in the sound insulating material 31, and are configured to be detachably connected to the corresponding first locking projection 35. Each first grommet 38 defines a first receiving hole 39 that receives the first locking projection 35 with a suitable resilient retaining force. The first grommets 38 may be insert molded when fabricating the engine cover 30.

Figure 5:
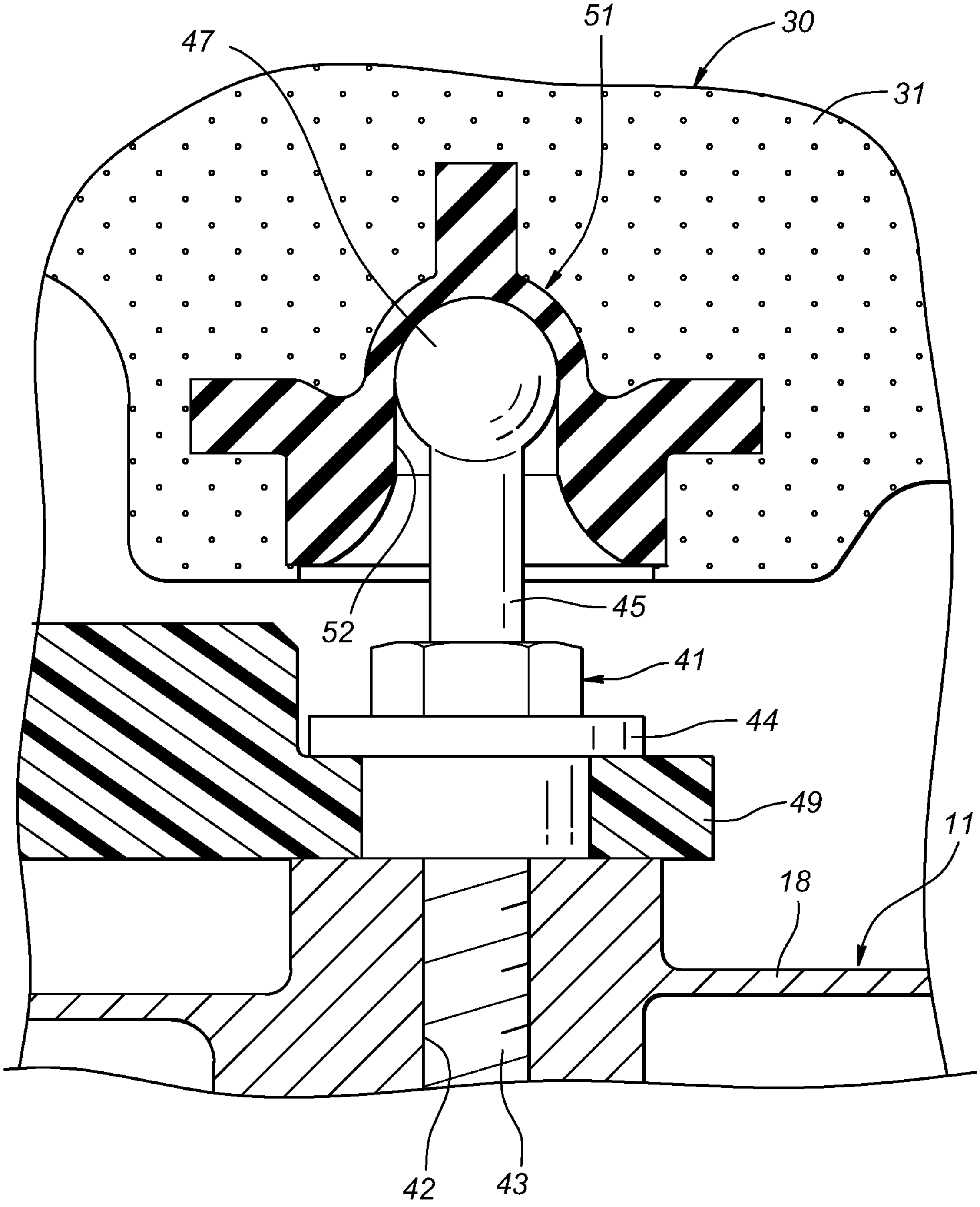
FIG. 5 is a view similar to FIG. 4 showing an engagement structure between the engine cover and the fuel pump.

The pump case 12, in particular the first case part 18, is provided with a second locking projection 41. The second locking projection 41 projects upward from the upper surface of the first case part 18. As shown in FIG. 5, the second locking projection 41 includes a bolt portion 43 threaded into a female threaded hole 42 formed in the first case part 18 and a shank portion 45 extending upward from the top end of the bolt portion 43 (or via a head portion 44 formed at the top end of the bolt portion 43), and a locking portion 47 provided at the tip end of the shank portion 45. The locking portion 47 may be formed in a spherical shape. The second locking projection 41 is preferably made of metal or resin material. The engine cover 30 has a second grommet 51 which is embedded in the sound insulating material 31. The second grommet 51 is provided with a second receiving hole 52 that receives the locking portion 47 of the second locking projection 41 with a suitably resilient retaining force.

The bolt portion 43 of the second locking projection 41 may be used for fastening other components or devices to the first case part 18. In this embodiment, the bolt portion 43 of the second locking projection 41 is used for fastening the harness holder 49 for supporting the wire harness 22 to the first case part 18 by making use of the head portion 44.

The first grommets 38 and the second grommet 51 are provided with a flexibility that makes them suitable for resiliently engaging the first locking projection 35 and the second locking projection 41, respectively. The first grommets 38 and the second grommet 51 are made of a non-electroconductive material in particular having a lower electroconductivity than the sound insulating material 31. The first grommet 38 and the second grommet 51 are preferably made of rubber or elastomer such as ethylene propylene diene rubber (EPDM).

The sound insulating material 31 of the engine cover 30 is in contact with the pump case 12, in particular with the outer peripheral surface of the second case part 19 of the pump case 12. The sound insulating material 31 has a receiving recess 56 having a part-cylindrical shape configured to receive an upper part of the second case part 19. The receiving recess 56 is formed in the lower surface of the sound insulating material 31 and recessed upward. The receiving recess 56 has a planar end wall 57 facing the end face 58 of the second case part 19 in the axial direction. The receiving recess 56 and the second case part 19 may be configured in different ways, and but are preferably shaped in a mutually complementary manner in order to ensure a secure retention of the engine cover 30 and a favorable electrical connection between the engine cover 30 and the second case part 19.

The sound insulating material 31 of the engine cover 30 may come into contact with the head cover 5 and/or the harness cover 23. Also, the receiving recess 56 may also tightly receive the second case part 19 in such a manner that an electric connection between these two parts may be ensured at all times and/or the engine cover 30 may be positively retained by the second case part 19 or any other part of the fuel pump 11 (thereby aiding the engaging action between the second locking projection 41 and the second grommet 51).

In the internal combustion engine 1 of the illustrated embodiment, an electrostatic charge generated in the engine cover 30 is discharged to the cylinder head 3 via the pump case 12 so that the engine cover 30 is prevented from being undesirably electrically charged. The engine cover 30 covers the spark plugs 21 and the wire harness 22 connected to the spark plugs 21 so as to conceal them from external view. Thus, even though the wire harness 22 and the spark plugs 21 that may generate an electrostatic charge are positioned near the engine cover 30, the engine cover 30 is prevented from being electrostatically charged owing to the presence the electric path leading to the cylinder head 3 via the pump case 12.

The engine cover 30 is simple in structure as it is made of the polyurethane foam sound insulating material 31, the skin material provided on the surface of the sound insulating material 31, and the first grommets 38 and the second grommet 51 provided on the sound insulating material 31. Since the engine cover 30 can be attached to the head cover 5 simply by inserting the first locking projections 35 into the first grommets 38 and inserting the second locking projection 41 into the second grommet 51, the assembling of the engine cover 30 to the head cover 5 is facilitated.

Since the second case part 19 of the pump case 12 extends from the first case part 18 toward the engine cover 30, the sound insulating material 31 can easily come into contact with the pump case 12. Further, since the sound insulating material 31 has the receiving recess 56 for receiving the second case part 19, the contact between the sound insulating material 31 and the second case part 19 can be established in a reliable manner. Since the end wall 57 of the receiving recess 56 faces the end face 58 of the second case part 19, the sound insulating material 31 is prevented from moving relative to the second case part 19 in a reliable manner.

The present invention has been described in terms of a specific embodiment, but the present invention is not limited by such embodiments and can be modified in various ways without departing from the scope of the present invention. Moreover, not all of the constituent elements shown in the above embodiments are essential to the broad concept of the present invention, and they can be appropriately selected, omitted and substituted without departing from the gist of the present invention. The contents of any cited references in this disclosure will be incorporated in the present application by reference.

The invention claimed is:

1. An internal combustion engine, comprising:

an electroconductive cylinder head;

a head cover attached to the cylinder head;

a fuel pump attached to the cylinder head and including an electroconductive pump case electrically connected to the cylinder head; and an engine cover positioned so as to oppose the head cover and the fuel pump, wherein the engine cover includes a sound insulating material in contact with the pump case, the fuel pump is attached to a longitudinal end part of the cylinder head, and the head cover is overlaid on the cylinder head, the engine cover being overlaid on the head cover and the fuel pump, the sound insulating material is made of polyurethane foam, the fuel pump includes a pump drive shaft connected to a camshaft of the engine, a cam fixedly provided on the pump drive shaft, a plunger extending orthogonally to the pump drive shaft and configured to reciprocate driven by the cam, the pump case includes a first case part directly attached to the cylinder head and a second case part attached to the first case part and supporting the plunger so as to reciprocate therein, the second case part extending from the first case part toward the engine cover, and being in contact with the sound insulating material, the head cover is provided with a plurality of locking projections, and the engine cover is provided with grommets configured to detachably engage the corresponding locking projections, and one of the plurality of locking projections projects upward from the upper surface of the first case part.

2. The internal combustion engine according to claim 1, wherein the engine further includes a spark plug having an upper end projecting from an upper surface of the cylinder head, and a wire harness positioned between the head cover and the engine cover for supplying electric power to the spark plug.

3. The internal combustion engine according to claim 1, wherein the grommets are made of elastomeric material.

4. The internal combustion engine according to claim 1, wherein the head cover is made of polyamide synthetic resin.

5. The internal combustion engine according to claim 1, wherein the second case part has a cylindrical outer shape while the sound insulating material is in contact with an outer peripheral surface of the second case part.

6. The internal combustion engine according to claim 5, wherein the sound insulating material is provided with a receiving recess configured to complementarily receive a part of the second case part.

7. The internal combustion engine according to claim 6, wherein the receiving recess is provided with an end wall axially opposing an end face of the second case part.

* * * * *